United States Patent [19]
Rodeheffer

[11] Patent Number: 5,095,460
[45] Date of Patent: Mar. 10, 1992

[54] ROTATING PRIORITY ENCODER OPERATING BY SELECTIVELY MASKING INPUT SIGNALS TO A FIXED PRIORITY ENCODER

[75] Inventor: Thomas L. Rodeheffer, Mountain View, Calif.

[73] Assignee: Digital Equipment Corporation, Maynard, Mass.

[21] Appl. No.: 342,946

[22] Filed: Apr. 25, 1989

[51] Int. Cl.⁵ .............................................. G06F 13/18
[52] U.S. Cl. .................... 395/650; 364/242.6; 364/242.8; 364/242.9; 364/259.7; 11/DIG. 1
[58] Field of Search ... 364/200 MS File, 900 MS File; 370/85.6; 340/825.5

[56] References Cited

U.S. PATENT DOCUMENTS

| | | | |
|---|---|---|---|
| 4,009,470 | 2/1977 | Danilenko | 364/200 |
| 4,130,864 | 12/1978 | Schlotterer | 364/200 |
| 4,302,808 | 11/1981 | Zanchi | 364/200 |
| 4,396,984 | 8/1983 | Videki | 364/200 |
| 4,400,771 | 8/1983 | Suzuki | 364/200 |
| 4,417,302 | 11/1983 | Chimienti | 364/200 |
| 4,420,806 | 12/1983 | Johnson | 364/200 |
| 4,438,489 | 3/1984 | Heinrich | 364/200 |
| 4,449,183 | 5/1984 | Flahive | 364/200 |
| 4,493,036 | 1/1985 | Boudreau | 364/200 |
| 4,499,538 | 2/1985 | Finger | 364/200 |
| 4,604,685 | 8/1986 | Brown | 364/200 |
| 4,609,995 | 9/1986 | Hasebe | 364/900 |
| 4,628,447 | 12/1986 | Cartret | 364/200 |
| 4,675,812 | 6/1987 | Capowski | 364/200 |
| 4,779,195 | 10/1988 | James | 364/200 |
| 4,821,177 | 4/1989 | Koegel | 364/200 |
| 4,881,195 | 11/1989 | DeLong | 364/900 |

OTHER PUBLICATIONS

Programmable Priority for Cycle Steal, C. J. Duggan, IBM Tech. Discl. Bul., vol. 19, No. 11, Apr. 1977, pp. 4354-4356.

Primary Examiner—Thomas C. Lee
Assistant Examiner—Eric Coleman
Attorney, Agent, or Firm—Flehr, Hohbach, Test, Albritton & Herbert

[57] ABSTRACT

A rotating priority encoder for selecting from a number of input priority request lines that input request line which is active and which designated as having the highest priority. A mask unit selectively passes only those input request signals which have index numbers which are equal to or greater than a predetermined base-point index number. A 2N priority encoder receives two sets of input signals: $L<i>$, the masked priority request signals from the mask unit, and $H<i>$ the original priority request signals. The masked priority signals $L<i>$ are given highest priority by this arrangement. The output signal of the 2N priority encoder is the index number of the lowest indexed active input request line. The base-point index number is periodically changed to designate a new input request line as having the highest priority. The masked priority request signals $L<i>$ are assigned the lowest numbers in a sequence of index numbers. The original priority request signals $H<i>$ are assigned the higher numbers in the sequence of index numbers. If the sequence of index numbers for the masked priority request signals $L<i>$ do not end with a number which is an integer power of two, some numbers are skipped before assigning index numbers to the $H<i>$ signals, beginning with a number which is an integer power of 2. For each input request line, the mask unit includes a circuit for determining whether the base-point index number exceeds a the index number of that input request number. The mask units and the 2N priority encoders are easily expanded.

9 Claims, 5 Drawing Sheets

| $i$ | BLOCK | X | I<2> | I<1> | I<0> | |
|---|---|---|---|---|---|---|
| 0 | 0 | 1 | 0 | 0 | 1 | * |
| | 1 | 2 | 0 | 1 | 0 | ** |
| | 1 | 3 | 0 | 1 | 1 | |
| | 2 | 4 | 1 | 0 | 0 | *** |
| | 2 | 5 | 1 | 0 | 1 | |
| | 2 | 6 | 1 | 1 | 0 | |
| | 2 | 7 | 1 | 1 | 1 | |
| 1 | 0 | 2 | 0 | 1 | 0 | * |
| | 1 | 2 | 0 | 1 | 0 | ** |
| | 1 | 3 | 0 | 1 | 1 | |
| | 2 | 4 | 1 | 0 | 0 | *** |
| | 2 | 5 | 1 | 0 | 1 | |
| | 3 | 6 | 1 | 1 | 0 | |
| | 4 | 7 | 1 | 1 | 1 | |
| 2 | 0 | 3 | 0 | 1 | 1 | * |
| | 1 | 4 | 1 | 0 | 0 | |
| | 1 | 5 | 1 | 0 | 1 | |
| | 2 | 4 | 1 | 0 | 0 | ** |
| | 2 | 5 | 1 | 0 | 1 | |
| | 2 | 6 | 1 | 1 | 0 | |
| | 2 | 7 | 1 | 1 | 1 | |
| 3 | 0 | 4 | 1 | 0 | 0 | * |
| | 1 | 4 | 4 | 0 | 0 | ** |
| | 1 | 5 | 1 | 0 | 1 | |
| | 2 | 4 | 1 | 0 | 0 | *** |
| | 2 | 5 | 1 | 0 | 1 | |
| | 2 | 6 | 1 | 1 | 0 | |
| | 2 | 7 | 1 | 1 | 1 | |

ROTATING PRIORITY ENCODER OPERATING BY SELECTIVELY MASKING INPUT SIGNALS TO A FIXED PRIORITY ENCODER

BACKGROUND OF THE INVENTION

1. Field of the Invention

This invention relates to priority encoders and, more particularly, to priority encoders, called rotating priority encoders, in which the request signals are arranged in a priority circle whose basepoint can be rotated at will.

2. Prior Art

A computer system often has limited facilities available at any one time to serve all of its users. Consequently, it is necessary to give priority to certain users according to some predetermined priority protocol using a priority encoder.

A conventional priority encoder is an electronic digital logic circuit which has a number of input request terminals which are connected to input request lines from particular users and which accept request signals from those users. When the signal on an input request line associated with a particular user is in its active state, it indicates that the particular user associated with that request line is requesting service. A conventional priority encoder circuit also has a number of output terminals which provide an output code word, called an index number, which is a binary-coded word identifying which of the active input request lines has highest priority. If a request signal is not present on the input request line with the highest priority, the input request line with next highest priority is selected as having the highest priority, and so forth.

It is desirable in a computing system that no active request for service be ignored forever and that, on the average, no input request line be favored more than any other input request line. This is accomplished, for example, by using what is called a rotating priority encoder. This concept is visualized by imagining the input request terminals for a priority encoding system to be arranged in a circle and by establishing one of the terminals as a base point. A priority encoder is then used to find the first active input request line which is located in a given direction (for example, counterclockwise) around the circle from the given base point. The base point is periodically moved, or rotated, from one input request line to another around the circle to insure that no individual input request is ever ignored and that on the average each input request is equally favored.

Figure 1:
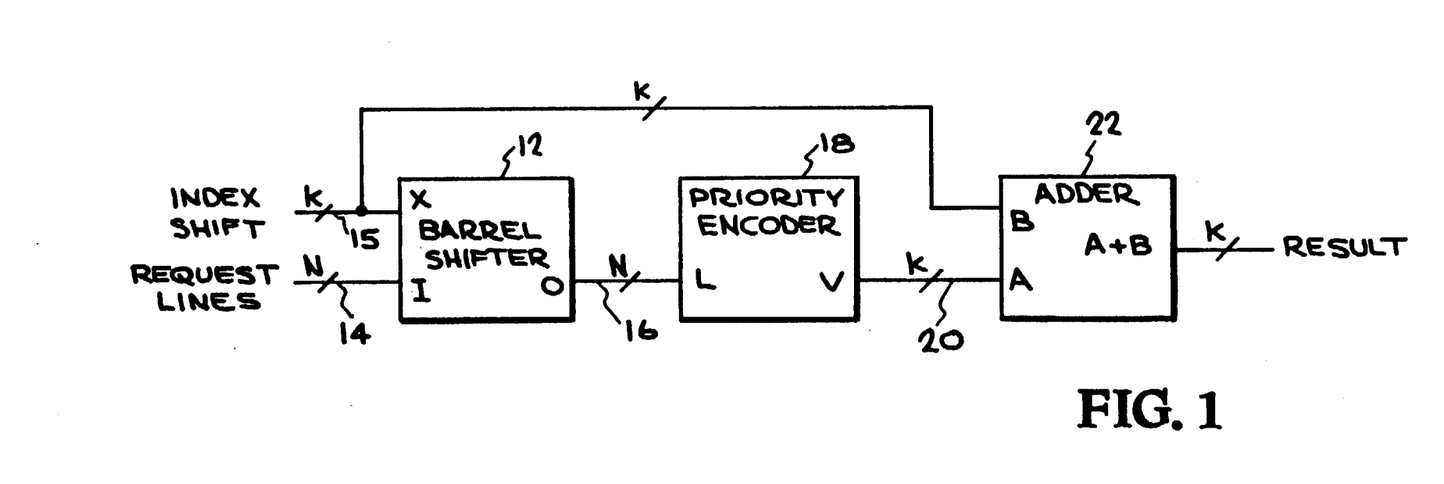
FIG. 1 is a block diagram of a prior art approach to implementing a rotating priority encoder using a barrel shifter.

FIG. 1 shows a conventional approach to a system 10 for implementing a rotating priority encoder. A conventional barrel shifter 12 receives input request signals I on N input request lines 14. A k-bit index-shift code word, called the index-shift code X, is received on k signal lines 15. X controls the number of bit positions through which the bits on the N input request lines 14 are rotated before being presented at the output terminals 0 of the barrel shifter 12. Note that the index-shift code has to be able to represent the values from 0 through N−1. Hence N can be no greater than 2 raised to the k power. N output lines 16 connected to the output terminals of the barrel shifter are then connected to the N input terminals of a priority encoder circuit 18. The function of this circuit 18 is to determine which of the rotated request lines 16 are active and which active line has the highest priority. The active rotated input request line with the highest priority is defined as the active line with the lowest index code word. Information identifying the highest priority active rotated line is presented as a k-bit binary code word V on k signal lines 20. An adder 22 is used to adjust V to compensate for the rotation of the input request signals caused by the barrel shifter 12. This is accomplished by adding the amount of shift provided by the index-shift code X to the code of the highest priority rotated request line.

A primary disadvantage of the conventional barrel-shifter approach is that it requires use of a barrel shifter. A barrel shifter is a complex circuit which takes a number of circuit devices to implement. In addition, for a large number of request lines, there is no convenient way to form a composite barrel shifter, which accepts a large number of input lines, by combining several barrel shifters having smaller numbers of input lines.

A number of cross-connections are required between the several component barrel shifters. Fast composite barrel shifter systems require one multiplexer circuit for each output line. This results in a circuit which is fast but very complex. Alternatively, a slower composite barrel shifter system can be produced using shift-registers, instead of barrel shifters and multiplexers. The shift-register implementation results in a circuit which is somewhat less complex but much slower in speed.

Another approach to implementing a rotating priority encoder for N input request lines is to use N priority encoders, one for each of the N possible base points and a multiplexer. Each one of the N priority encoders has the priority request signals connected to its input terminals in a different order, corresponding to the N available base points. In a rotating priority encoder, a base point is defined as the input request line which has been assigned the highest priority. Consequently, for this approach, each of the N priority encoders has a different request signal connected to its highest priority input terminal. For a given base point, the lower priority input request signals to a priority encoder are connected to input terminals having correspondingly lower priority. The lowest priority input request signals are wrapped and connected to the lowest priority input terminals of a particular priority encoder. The multiplexer for this system has N groups of input terminals, with each group connected to one of the index code word outputs from one of the N priority encoders. The index code word for the highest priority request is selected by the multiplexer from whichever priority encoder is associated with the desired priority base point. The base point is indicated as an index code word by the multiplexer. The base point index code word is periodically adjusted to shift the base point of the request lines. This approach implements a rotating priority encoder which is fast and easily expandable, but it requires a large number of circuits to implement. It also requires a number of cross-connections between each input request line and each of the N priority encoders.

SUMMARY OF THE INVENTION

It is therefore an object of the invention to provide a rotating priority encoder which is fast, efficient structured, and easily expanded, using conventional integrated circuit components as much as possible.

In accordance with this and other objects of the invention, a rotating priority encoder is provided which finds the index number of the highest priority request line for a given base-point index number. The rotating priority encoder selects that input request line which is active and which designated by a base-point index number signal X as having the highest priority. A mask unit receives the base-point index number X and selectively provides active output signals O<i> corresponding to only those input request signals I<i> which have index numbers which are equal to or greater than X. A 2N wide priority encoder receives two sets of input signals: L<i>, which are the masked priority request output signals O<i> from the mask unit, and H<i> which are the original priority request signals I<i>. The masked priority signals L<i> are given highest priority. The output signal V of the 2N wide priority encoder is the index number of the lowest indexed active input request line. The base-point index number is periodically changed, or rotated so to speak, to designate a new input request line as having the highest priority.

In one embodiment of the invention, the masked priority request signals L<i> are assigned the lowest numbers in a sequence of index numbers. The original priority request signals H<i> are assigned the higher numbers in the sequence of index numbers. If the sequence of index numbers for the masked priority request signals L<i> do not end with a number which is an integer power of two, some numbers are skipped before assigning index numbers to the H<i> signals, beginning with a number which is an integer power of 2. By starting H<i> at a power of 2, we make the adjustment easy. It can be performed by removing the highest bit of V.

For each input request line, the mask unit includes a circuit for determining whether the base-point index number exceeds a the index number of that input request number. The mask units and the 2N priority encoders are easily expanded.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 2:
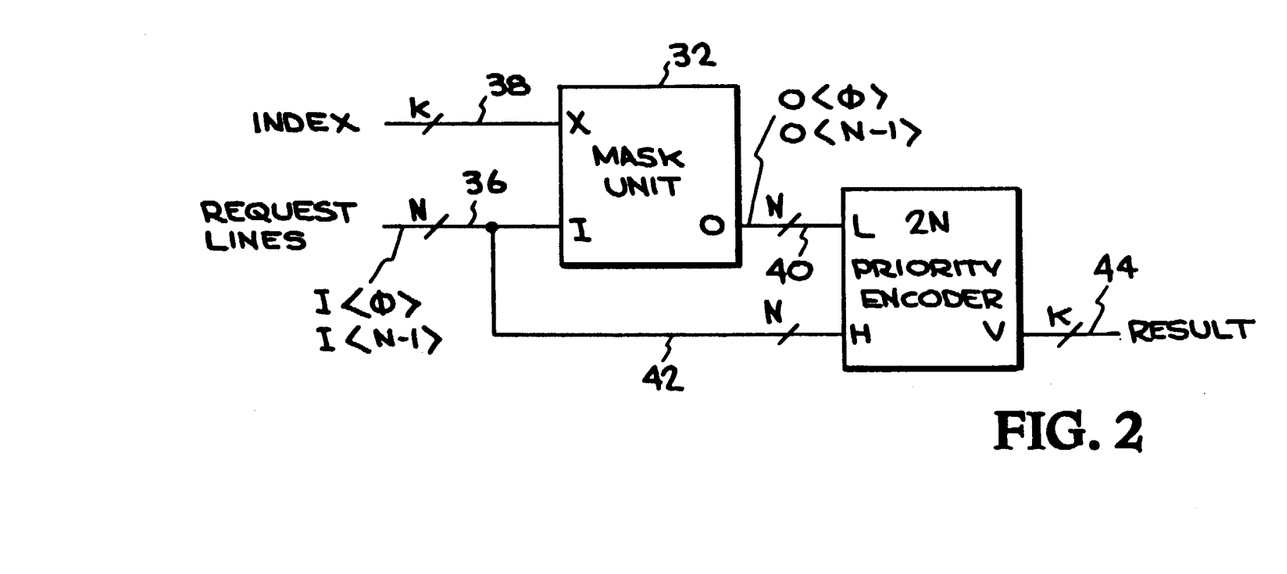
FIG. 2 is a block diagram of a rotating priority encoder using a mask unit followed by a 2N-wide priority encoder according to the invention.

FIG. 2 show a rotating priority encoder 30 according to the invention which includes a mask unit 32 and a 2N wide priority encoder 34. N input request signals from N users are received on N input request signal lines 36. An input request signal is active if it is at a 1 state, which indicates that the requester is actively requesting priority. An inactive request signal is at a 0 state. Signal lines 38 receive a k-bit base-point index number binary code word. The base-point index number is the index number for the input request line which has the highest priority.

The mask unit 32 is a device which receives priority request signals from each user on signal lines 36, which are connected to the input terminals I of the mask unit 32. These priority request signals are designated as I<i>, where i, the index variable, ranges from 0 to N−1 for the N priority request input lines. The mask unit 32 has output terminals O at which appear masked output signals designated as O<i>, where i is the same index variable which is associated with the input signals. The mask unit 32 receives the base point index signals at input terminals X. The mask unit 32 passes those input request signals from input terminals I to output terminals O which have an index variable greater than or equal to the base point index number X. The input request signals which have an index number which is less than the base point index number X are masked to the 0 inactive state by the mask unit 32. The mask unit provides the following relationship:

For i from 0 to N−1:

$$\text{if } i < X, \text{ then } O<i> = 0, \text{ else } O<i> = I<i. \tag{1}$$

In other words, the mask unit 32 provides a 0 output for all of the input request lines which have an index number i less than the base point index number X. And, for all of the input request lines which have an index number i equal to or greater than X, the mask unit provides an output O<i> which is equal to the value I<i> on the corresponding input request line.

The 2N priority encoder 34 is connected to two sets of N input signal lines at terminals L and H. Index numbers for each of the input lines to the 2N priority encoder are assigned as follows: The set of input lines L has each line designated as L<i>, where i is the index number ranging from 0 to N−1. Line L<0> has an index number 0, L<1> has in index number 1, and so on through L<N−1>. The signals set at terminals L is the set of masked output signals O<i>. These O<i> signals are received on N signal lines 40 from the mask unit 32. If N is not an integral power of two, certain index numbers are skipped before additional index numbers are assigned to the H set of input lines. Index numbers are skipped until an index number is reached which is an integer power of two. Let K be the integer power of two at which we resume assigning index numbers to the H input lines. Then line H<0> has an index number K, H<1> has an index number K+1, and so on through H<N−1>.

Table 1 lists assignments (for N=5, k=3, and K=8) given the low order input lines L<i> and the high order input lines H<i> for a 2N priority encoder having 10 input lines corresponding to 5 input request lines. Corresponding decimal and binary values of the index numbers i for the 2N priority encoder are listed.

TABLE 1

| Let N = 5, k = 3, K = 8 | | | |
|---|---|---|---|
| Input Line to 2N Wide Priority Encoder | Decimal Index Number | Binary Index Number | |
| L<0> | 0 | 000 | |
| L<1> | 1 | 001 | |
| L<2> | 2 | 010 | |
| L<3> | 3 | 011 | |
| L<4> | 4 | 100 | |
| H<0> | 8 | 1000 | K + i |
| H<1> | 9 | 1001 | |
| H<2> | 10 | 1010 | |
| H<3> | 11 | 1011 | |
| H<4> | 12 | 1100 | K + N − 1 |

The function of the 2N wide priority encoder unit is to find the value of the index number of the lowest-valued input line which has an active, or 1, value. The lower-indexed L input signals are given higher priority than the higher-indexed H inputs.

The output signals V of the 2N priority encoder 34 are provided on k signal lines 44. The signals V represent in binary form the lowest index number i of the active input request lines I<i>. Note that certain of the L signals are masked to the inactive 0 state by the mask unit 32. The k+1 bit, which corresponds to the value of K, is dropped for V. Analysis of the example of Table 1 shows that, if the lower order signals in L<i> are masked to the inactive 0 state, V will give the index number corresponding to the lowest indexed active input line. V does not differentiate between the lowest index being derived from either L or H inputs to the 2N wide priority encoder.

The system shown in FIG. 2 therefore functions as a rotating priority encoder by using the double-width 2N priority encoder to "promote" some of the input request lines to consideration ahead of others request lines. All of the input request lines appear as H inputs. Only those unmasked request lines with index numbers greater than or equal to X, the index number for the current base point index number of the system, appear as L inputs. Thus only the unmasked L inputs have higher priority over the H inputs. The input request lines which have masked inputs to L are, in effect, rotated to the end of the priority line.

Figure 3:
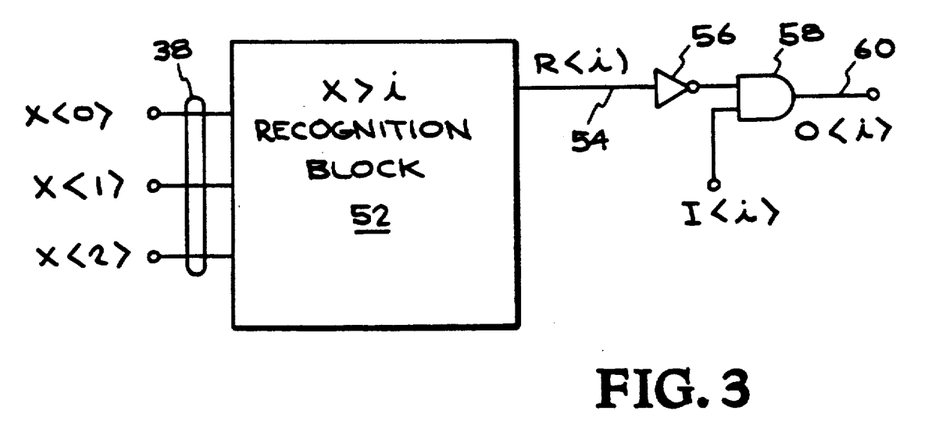
FIG. 3 is a block diagram of a masking device for determining whether a base-point index number X is greater than a particular input request line number i.

FIG. 3 is a block diagram of a mask circuit 50 for masking an input request line I<i>. The mask unit 32 includes a number of these mask circuits 50, one for each input request line. Note that each input request line has its own specific value of i. To implement this circuit for some particular value of i, k signals X<0> to X<k−1> representing the k bits for the base-point index number X are received from the signal lines 38 by a recognition block 52. This block 52 generates from the base-point index number input signal X a recognition signal R<i> on a signal line 54 which indicates that the base-point index number X is greater than i. If X is greater than 0, the mask unit is supposed to provide 1 for O<i>, otherwise it provides I<i>. The recognition signal indicates that a zero is required. See equation (1) hereinabove. The complement of the recognition signal is provided by the invertor 56 and fed to one input terminal of the 2-input AND gate 58 where it is then ANDed with I<i> to yield O<i> on signal line 60, which is part of the group of signals lines 40 as shown in FIG. 2.

One way to generate the recognition signal R(i) is to "recognize" values of X that are greater than i. This is accomplished by arranging the set of values of X which are above the base-point index number into a series of k power-of-two sized subrange blocks, numbered 0 through k−1. In this system a subrange block b (where b ranges from 0 to k−1) contains $2^b$ consecutive values of X and starts with the first multiple of $2^b$ in the set to be recognized. Each subrange block is tested to see if it contains values which are greater than the base-point index number by ANDing together those bits from X<i> which correspond to those bits that have a value of 1 in the first bit value of the subrange block. This implementation also recognizes some values of X larger than those in the block, but that makes no difference. The recognition signal R<i> is then computed by ORing all of the block recognition signals. The mask unit has the combinatorial complexity of one k-AND/k-OR gate per output line, where k is the number of bits in X, the base-point index number.

Figure 4A:
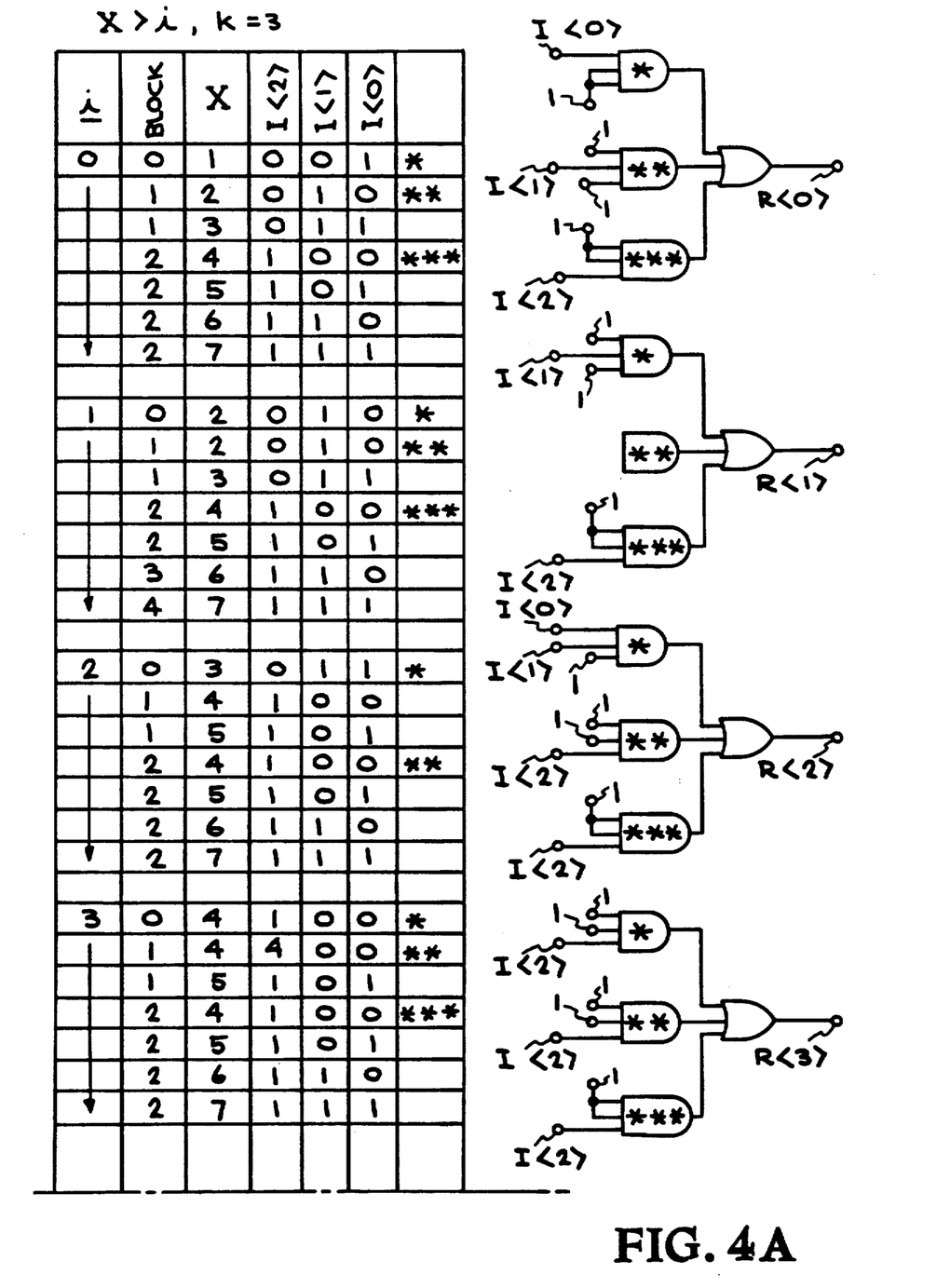
FIGS. 4A and 4B are a block diagram of a recognition system which groups the input request signals I<i> into k blocks for generating a recognition signal R<i> for each input request signal I<i>.
Figure 4B:
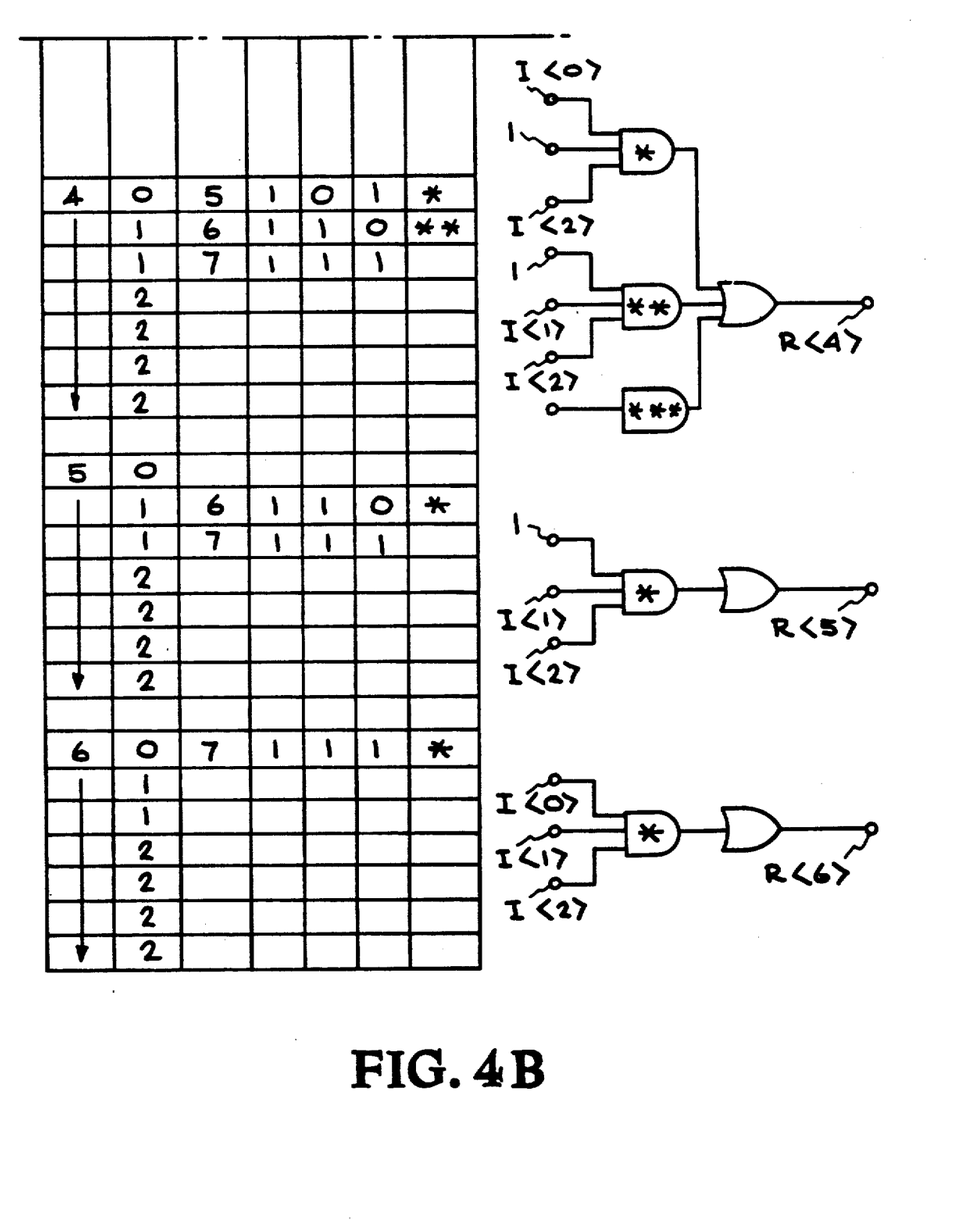

FIG. 4 shows a specific implementation of the sub-block method to generate recognition signals for X>i, where N=8 and k=3, for values of the index number i from 0 to 7. Note that some parts of the circuit are redundant.

Using a similar technique, one could instead recognize the complement case of X<=i by recognizing where the 0 values exist in the X bits. Recognition of those 0 bit values is achieved by complementing the 0 values prior to the AND gate. The AND function provided by AND gate 58 can be accomplished by ANDing I<i> back in the k-AND/k-OR gate stage so that just two levels of logic ar required for the output signals O<i>. A small mask unit, for example for N<8, is easily implemented in a standard PAL logic unit.

Figure 5:
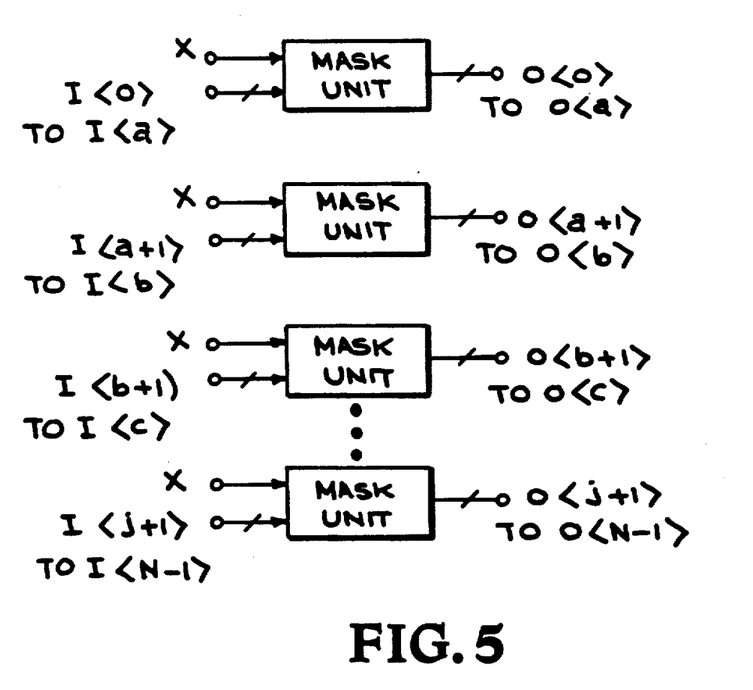
FIG. 5 is a block diagram of a wide mask unit formed as a column of specialized narrow mask units.

Because each O<i> depends only on X and I<i>, wide mask units can be constructed from a column of narrow mask units, with each narrow mask unit receiving X and processing some range of input lines I<i> as diagrammatically indicated in FIG. 5.

Figure 6:
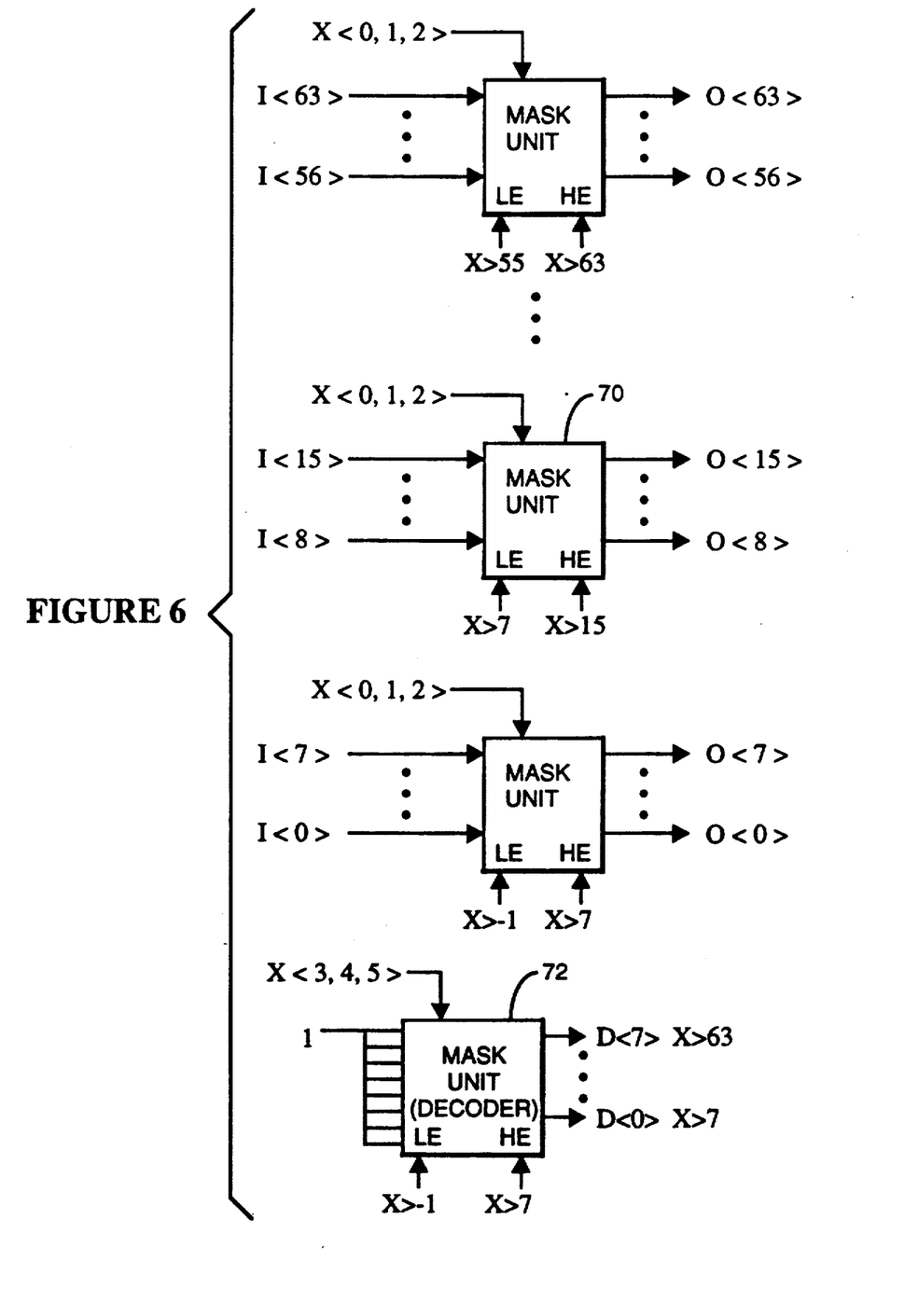
FIG. 6 is a block diagram of a wide mask unit formed from a number of general narrow units.

FIG. 6 shows by way of example, alternatively, that one could design a general narrow mask unit (typically shown at 70) that takes n low-order bits of X<0,1,2>, a block of $2^n$ input lines I<8−15>, and a pair of input enable signals LE, HE that encode whether X is below, in, or above this unit's block of input lines. Such enable signals LE, HE are generated by a general narrow mask unit 72 operating on the high-order bits X<3,4,5> with input lines that are permanently wired active. This alternative technique allows one to construct extremely wide mask units.

The design can be expanded without limit by constructing trees of demux logic in the mask unit and trees of selection logic in the priority encoder.

The advantages of this design are that it is fast, efficiently uses circuits, and is easy to expand. For moderate N, the delay path is minimally one AND/OR gate in the mask unit, one AND/OR gate in the column of priority encoders, and one AND/Or gate in the selector. For N=16, this design can be built using three standard PALs for the mask unit, four 8-input priority encoders, and two standard PALs for the selector.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A priority encoder which selects one of a plurality of input request lines having highest priority, comprising:

N input lines for receiving N input request signals, each line having a corresponding index number assigned thereto;

priority specifying means for specifying a priority index value;

masking means, coupled to said N input lines and said priority specifying means, for generating N masked input request signals, said masking means including means for masking all of said input request signals on input lines having a corresponding index number with a predefined inequality relationship to said specified priority index value so as to generate inactive masked input request signals, and for passing all others of said input request signals to generate corresponding ones of said masked input request signals; and fixed priority encoder means having 2N input ports having fixed, relative priorities assigned thereto, a first N of said input ports coupled to said N mask lines and a second N of said input ports coupled to said N input lines; said first N input ports having higher assigned priorities that said second N input ports; said fixed priority encoder means selecting the highest priority of said input ports which has an active input request signal thereon and generating data signals indicating said selected input port;

whereby a rotating priority selection is made from N input lines using a fixed priority encoder means having 2N inputs.

2. The priority encoder of claim 1, wherein said index values corresponding to said input lines are assigned such that input lines coupled to input ports of descending priority have assigned index values which monotonically change in value; whereby there is a monotonic relationship between said index values assigned to said input lines and their priority of selection within said 2N input ports of said fixed priority encoder.

3. The priority encoder of claim 2, wherein said mask lines are coupled to said input ports of said fixed priority encoder so said monotonic relationship between index values assigned to input lines and priority of selection by said fixed priority encoder also governs which mask line is coupled to each of said input ports of said fixed priority encoder.

4. A priority encoder which selects one of a plurality of input request lines having highest priority, comprising:

N input lines for receiving N input request signals, each line having a corresponding index number assigned thereto;

priority specifying means for specifying a priority index value;

masking means, coupled to said N input lines and said priority specifying means, for generating N masked input request signals, said masking means including means for masking all of said input request signals on input lines having a corresponding index number which are less than said specified priority index value and for passing all others of said input request signals; and fixed priority encoder means having 2N input ports having fixed, descending priorities assigned thereto, a first N of said input ports coupled to said N mask lines and a second N of said input ports coupled to said N input lines; said first N input ports having higher assigned priorities that said second N input ports; said fixed priority encoder means selecting the highest priority of said input ports which has an active input request signal thereon and generating data signals indicating said selected input port;

whereby a rotating priority selection is made from N input lines using a fixed priority encoder means having 2N inputs.

5. The priority encoder of claim 4, wherein said index values corresponding to said input lines are assigned such that input lines coupled to input ports of descending priority have assigned index values which monotonically change in value; whereby there is a monotonic relationship between said index values assigned to said input lines and their priority of selection within said 2N input ports of said fixed priority encoder.

6. The priority encoder of claim 5, wherein said mask lines are coupled to said input ports of said fixed priority encoder so said monotonic relationship between index values assigned to input lines and priority of selection by said fixed priority encoder also governs which mask line is coupled to each of said input ports of said fixed priority encoder.

7. A rotating priority method of selecting one of a plurality of input request signals, the steps of the method comprising:

receiving N input request signals, including active and inactive request signals, each input request signal having a corresponding index number assigned thereto;

specifying a priority index value;

generating N masked input request signals, including masking all of said input request signals having a corresponding index number with a predefined inequality relationship to said specified priority index value so as to generate inactive masked input request signals, and passing all others of said input request signals to generate corresponding ones of said masked input request signals; and transmitting said N input request signals and said N masked request signals to distinct input ports of a fixed priority encoder having 2N input ports with fixed, relative priorities assigned thereto; said N masked input request signals being transmitted to input ports of higher relative priority than the input ports to which said N input request signals are transmitted;

selecting the highest priority of said input ports which receives an active input request signal thereon and generating data signals indicating said selected input port;

whereby a rotating priority selection is made from N input request signals using a fixed priority encoder having 2N inputs.

8. The rotating priority selection method of claim 7, wherein said index values corresponding to said input request signals are assigned such that input request signals transmitted to input ports of descending priority have assigned index values which monotonically change in value; whereby there is a monotonic relationship between said index values assigned to said input request signals and their priority of selection within said 2N input ports of aid fixed priority encoder.

9. The rotating priority selecting method of claim 8, wherein said masked input request signals are transmitted to said input ports of said fixed priority encoder so that said monotonic relationship between index values assigned to input request signals and priority of selection by said selecting step also governs which masked input request signal is transmitted to each of said input ports of said fixed priority encoder.

* * * * *

UNITED STATES PATENT AND TRADEMARK OFFICE
CERTIFICATE OF CORRECTION

| | |
|---|---|
| PATENT NO. | : 5,095,460 |
| DATED | : March 10, 1992 |
| INVENTOR(S) | : Thomas L. Rodeheffer |

It is certified that error appears in the above-identified patent and that said Letters Patent is hereby corrected as shown below:

Column 8,
Line 9, delete "that" and insert therefor -- than --

Signed and Sealed this

Twenty-first Day of June, 2005

JON W. DUDAS
*Director of the United States Patent and Trademark Office*